Oct. 10, 1950     H. WILLSHAW     2,525,744
CALENDER

Filed March 9, 1948     3 Sheets-Sheet 1

INVENTOR.
HARRY WILLSHAW
BY
Benj. T. Rauber
ATTORNEY

Oct. 10, 1950          H. WILLSHAW          2,525,744
CALENDER
Filed March 9, 1948          3 Sheets-Sheet 3
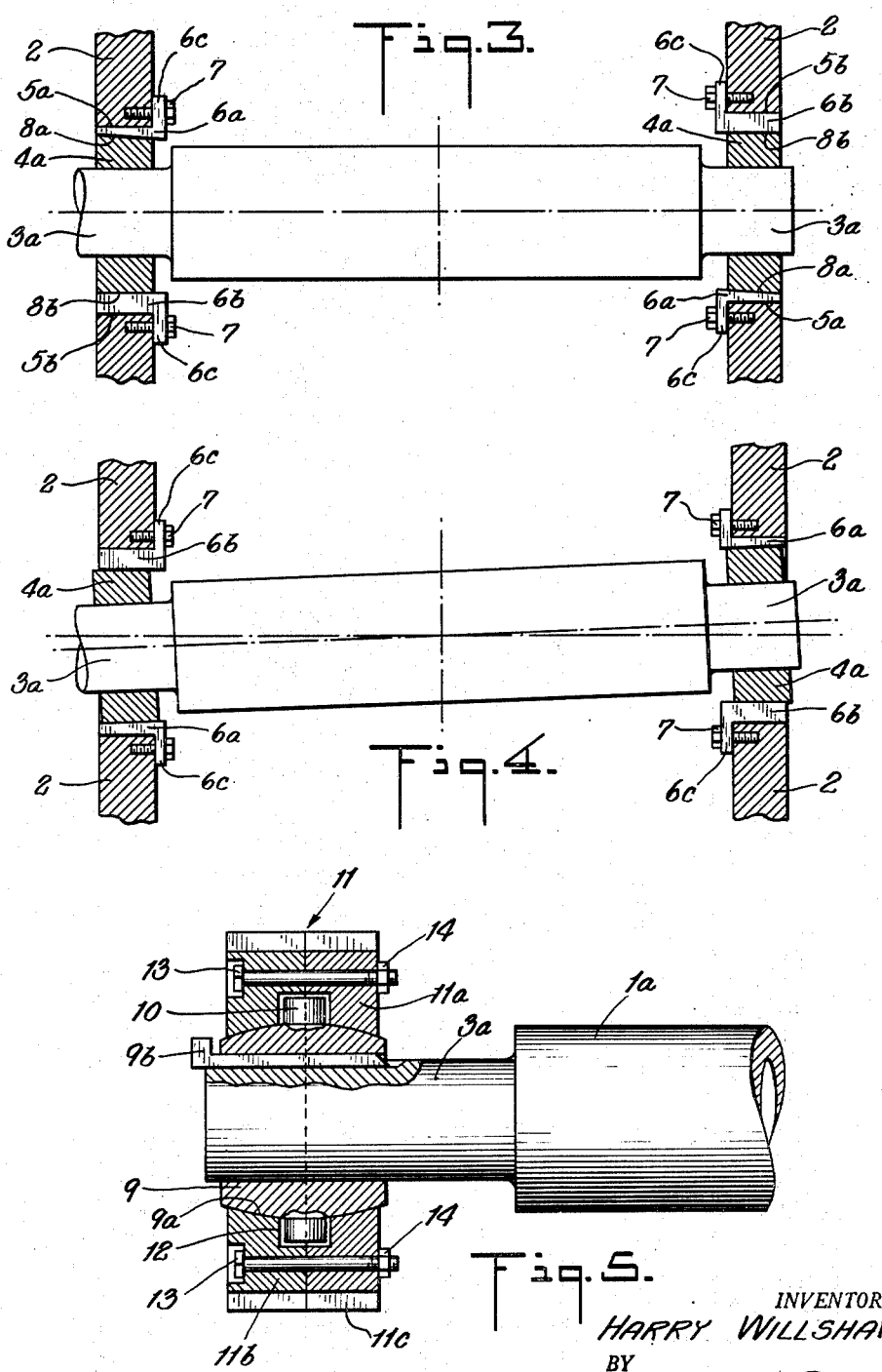
INVENTOR.
HARRY WILLSHAW
BY
Benj. T. Rauber
ATTORNEY Patented Oct. 10, 1950

2,525,744

UNITED STATES PATENT OFFICE 2,525,744

CALENDER

Harry Willshaw, London, England, assignor to Dunlop Tire and Rubber Corporation, Buffalo, N. Y., a corporation of New York Application March 9, 1948, Serial No. 13,899
In Great Britain March 3, 1947

5 Claims. (Cl. 18—2)

This invention relates to calenders for the production of sheet rubber and the like.

In many calendering processes, such as for example those used in the rubber industry for the production of tire fabrics, very high pressures are applied to the materials passing through the rolls with the results that the rolls flex and the calendered material has a variable thickness throughout its width. Uniformity of thickness of the material is however of primary importance. This may be obtained by pre-cambering the rolls, but lengthy tests are necessary to determine the correct camber for the rolls which when provided cannot be readily corrected to allow for different degrees of bending induced by differences in temperature, material or thickness of sheet.

It has also been proposed to skew one roller relative to its neighbor. This has the effect of increasing the clearance between the rolls at their extremities, and by varying the angle of inclination the equivalent effect of different cambers on the rolls may be obtained. In one arrangement this has been done by providing the roll to be skewed with bushes which are mounted in eccentrically mounted bearings. Means are provided for rotatably adjusting the bushes and thus changing as desired the position of the axis of the roll relative to the axis of its neighbor. This movement however not only changes the angle of inclination between adjoining rolls but changes the clearance or nip between the rolls which consequently must be adjusted whenever a roll is skewed.

Another arrangement has been proposed wherein the position of one roll in relation to others is changed by moving the bearings of one roll laterally, by motor driven means, one in one direction and the other in the opposite direction. The movement of the bearings must however be synchronised and means must be provided to hold the bearings firmly in the various positions to which they may be moved. Such an arrangement is complicated and costly, and may involve a reduction of the roll bearing diameter.

My present invention avoids these objections and provides means for skewing a calender roll which is relatively simple and inexpensive.

In my present invention the position of the bearings for at least one of the calender rolls is adjustable by a wedge means in a direction at right angles to the direction of thrust between said roll and an adjacent roll whereby the axis of the roll may be skewed relative to the axis of the adjacent roll.

In a preferred embodiment of the invention each of the bearings of the calender roll to be skewed is located in a housing, as for example an opening in the calender frame, and is positioned therein sidewise of the direction of thrust by a pair of spacing members or blocks on opposite sides of the bearing, one member of each pair having parallel sides or faces and closing the space between parallel opposed faces of the bearing and of the frame opening, and the other member of the pair having inclined faces to give it a wedge shape to fit a wedge shape space or opening between the opposite side of the bearing and frame opening. The positions of the pairs of members at opposite ends of the roll are reversed so that the axis of the roll may be skewed to and in a plane parallel to the axis of the adjacent roll.

The invention is illustrated, by way of example, in the accompanying drawings in which Fig. 1 is a diagrammatic elevation of a set of four calender rolls of which the first and last are adjustable;

Fig. 3 is a diagrammatic view partly in section of the calender roll and frame and showing the position of the wedges for a non-skewed position of the rolls;

Fig. 4 is a similar view with the wedges transposed to give a skewed position of one roll with respect to another;

Fig. 5 is a sectional elevation of means for transferring the drive to an adjustable roll.

Figure 1:
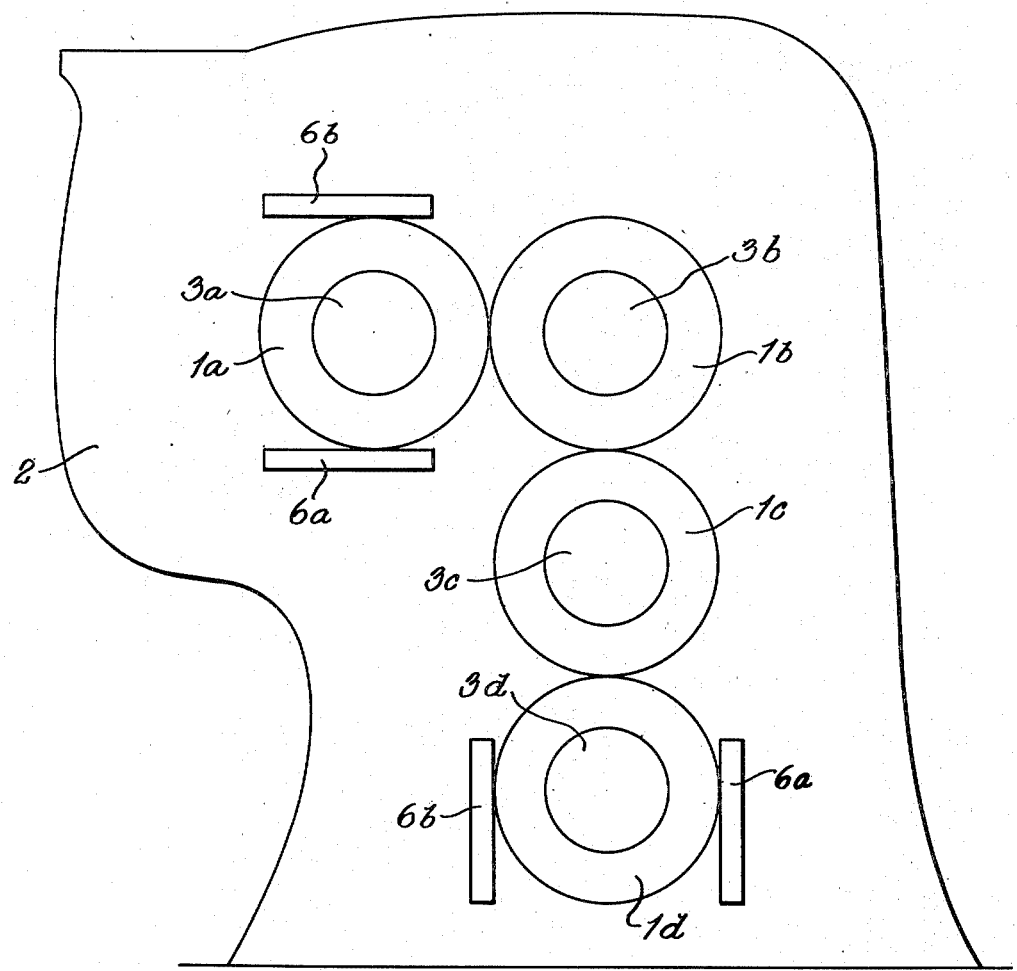
Figure 2:
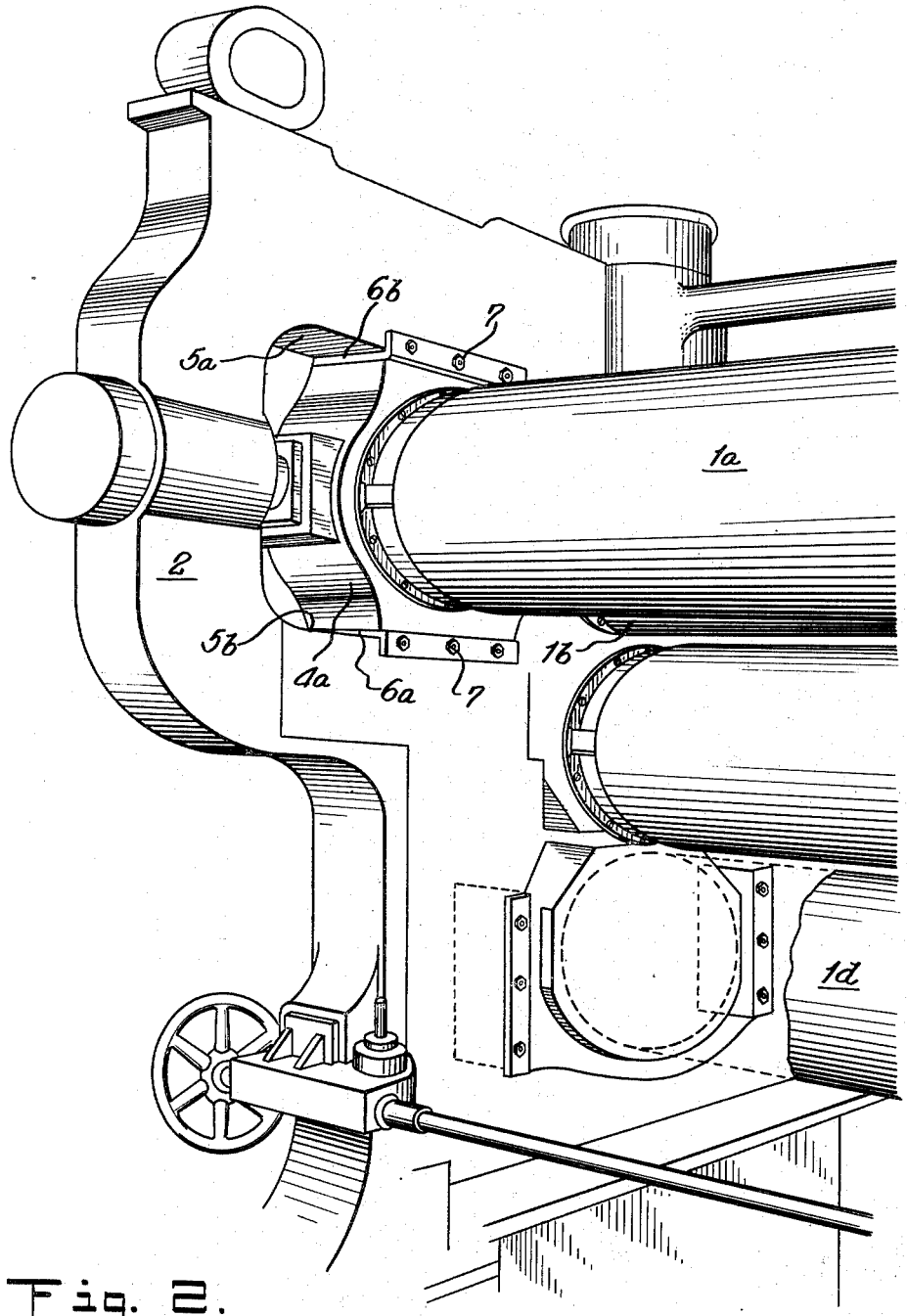
Fig. 2 is a perspective view of a part of a calender showing the position of the rolls and bearings.

As shown in Figs. 1 and 2 four rolls 1a, 1b, 1c and 1d are supported in end frames 2 (of which one only is shown) the arrangement being such that one pair of rolls have their axes in a vertical plane. The driving means and bearings for the rolls are not shown. In this arrangement the two end rolls, 1a, 1d, are adapted to be skewed, the rolls 1b, 1c adjoining them being fixed.

Dealing with the upper end roll 1a (since the skewing means for roll 1d is identical therewith though in a different plane) the roll shaft 3a is carried in bearings 4a which have two plane faces 8a, 8b, Figs. 3 and 4. The face 8b is parallel to the roll axis but the face 8a is inclined thereto at a slight angle, and the corresponding faces in the two bearings are on opposite sides of the roll axes. Each bearing is received in a bearing box or housing comprising an opening in the calender frame having two parallel faces 5a, 5b and is located or fixed therein by means of a parallel wedge 6b and a tapered wedge 6a, the angle of taper being the same as the angle of inclination of the face 8a. Each wedge is inserted from the inside of the calender frame and is forced outwardly by bolts 7 engaging with flanged portions 6c of the wedges. In one position of the tapered and parallel wedges, when the inclined face of the tapered wedge mates with the inclined face of the bearing, the roll axis is normal to the frame and parallel to the axis of the adjacent roll as shown in Fig. 3, but when the position of the wedges is reversed, so that the inclined face of the tapered wedge mates with the parallel face of the bearing the roll axis is skewed with respect to the axis of the adjacent roll, as shown in Fig. 4.

The thickness of the wedges and the bearings is such that when the roll axis is in the parallel position it is nearer to the faces 5a than to the faces 5b.

Other skew positions of the roll are obtained by withdrawing the wedges and inserting others having the desired thickness and the requisite taper. It is however not necessary to modify the taper on the bearing bush. An advantage of having different wedges for different skew positions is that the control of the calender operations is improved, since the change-over cannot readily be made, and there is on that account less risk of the change being effected by an unauthorised person.

With a normal drive any movement of the axis of one of the rolls will prevent the teeth of the gear wheels from meshing correctly though if the angle of inclination of the skew roll is very small, the ordinary gear drive for the rolls of the calender may suffice. This difficulty may, however, be overcome by providing each roll with an independent drive or by mounting the driven gear wheel on a hub fixed to the roll shaft and movable with respect to the periphery of the pinion to permit the drive to function correctly when the roll is skewed.

In the preferred embodiment the latter type of construction, Fig. 5, is employed. The hub 9 is secured to the roll shaft 3a by a key 9b and is provided with a number of spigots 10 of circular cross-section which receive the drive from the inner periphery of the driven gear wheel 11 through their engagement with slots 12 formed in the latter. Bushings may be provided for the spigots so that when wear develops the slack can be taken up by renewing the bushings.

The gear wheel 11 is supported and centered on the hub 9 by means of co-operating concave and convex surfaces 11a, 9a, formed in the two parts respectively, these surfaces being parts of the surfaces of spheres having their centers at the center of symmetry of the gear wheel.

By this means the hub member is capable of a universal motion within the gear wheel since the surface engagement provides, in effect, portions of a ball and socket connection.

For ease of assembly, the gear wheel 11 is split circumferentially into two half sections 11b, 11c. The two halves are united by pinch bolts 13 and nuts 14 passing through holes adjacent to the gear periphery and disposed transversely of the two gear halves. Since each hub driving spigot 10 is in the plane passing centrally through the gear periphery and normal to the gear shaft, one half of the bushing for each spigot will be located in each gear half. By this means a very simple method of assembling the gear wheel upon its hub is provided, the method of assembly consisting in first locating one gear half 11c around the calender shaft, then mounting upon the shaft the hub 9 together with its key 9b and finally the outer gear half 11b with the spigots properly located within the bearing recesses between the two halves. The two halves are then bolted together as previously described.

Having described my said invention, what I claim is:

1. A calender which comprises a calender roll having cylindrical journal surfaces at its ends, a bearing for each of said journal surfaces having aligned cylindrical bearing openings to receive said journal surfaces each said bearing having an exterior thrust transmitting surface and a pair of faces to position the bearing sidewise of said thrust, a housing for said bearing having a pair of faces opposed to the sidewise positioning faces of said bearing and being inclined to each other to form an opening tapering longitudinally of said roll, and blocks filling and fitting the spaces between said positioning faces, said blocks being interchangeable to provide two positions for said roll and bearings of relatively angular axial displacement.

2. A calender which comprises a pair of bearings having aligned cylindrical bearing openings each said bearing having a thrust receiving face and a pair of faces to position said bearing sidewise of said thrust, a housing for each bearing having a pair of faces opposed to and spaced from the sidewise positioning faces of said bearing, a pair of opposed sidewise positioning faces of said bearing and housing being parallel and the other pair being inclined to each other to form an opening tapering longitudinally of said roll, and blocks filling and fitting the spaces between said positioning faces, said blocks being interchangeable to provide two positions for said bearings of relatively angular axial displacement.

3. A calender as claimed in claim 1 wherein the driving means for the said adjustable roll comprises a gear wheel mounted on a spherical-surfaced hub keyed to the shaft of the said roll, the said gear wheel and hub having interengaging lugs and cavities adapted to constitute a driving connection, whereby the teeth of the said gear wheel are adapted to mesh correctly with the teeth of the adjacent gear wheel when the said roll is skewed relative to the adjacent roll.

4. A calender as claimed in claim 3 wherein the said lugs and cavities are cylindrical in shape.

5. A calender as claimed in claim 3 wherein the said gear wheel is in halves axially and bolted together.

HARRY WILLSHAW.

REFERENCES CITED

The following references are of record in the file of this patent:

UNITED STATES PATENTS

| Number | Name | Date |
|---|---|---|
| 1,004,771 | Gibbons | Oct. 3, 1911 |
| 2,180,046 | Gleissner | Nov. 14, 1939 |

FOREIGN PATENTS

| Number | Country | Date |
|---|---|---|
| 528,671 | Great Britain | Nov. 4, 1940 |